(12) United States Patent
Mimura

(10) Patent No.: US 7,298,138 B2
(45) Date of Patent: Nov. 20, 2007

(54) STATOR STRUCTURE FOR A ROTATION DETECTOR

(75) Inventor: Hisashi Mimura, Nagano-ken (JP)

(73) Assignee: Tamagawa Seiko Kabushiki Kaisha, Nagano-Ken (JP)

(*) Notice: Subject to any disclaimer, the term of this patent is extended or adjusted under 35 U.S.C. 154(b) by 1115 days.

(21) Appl. No.: 10/314,332

(22) Filed: Dec. 9, 2002

(65) Prior Publication Data

US 2007/0069599 A1    Mar. 29, 2007

(51) Int. Cl.
G01B 7/30   (2006.01)
H02K 1/12   (2006.01)

(52) U.S. Cl. .............. 324/207.25; 310/254; 310/217; 310/67 R

(58) Field of Classification Search .......... 324/207.25; 310/217, 67 R, 254
See application file for complete search history.

(56) References Cited

U.S. PATENT DOCUMENTS 3,046,604 A * 7/1962 Graham et al. ............ 249/91
5,920,135 A * 7/1999 Ohshita .................... 310/71

FOREIGN PATENT DOCUMENTS

JP    09-005183    * 7/1998
JP    11-160999    * 12/2000

* cited by examiner

Primary Examiner—Reena Aurora
(74) Attorney, Agent, or Firm—Sughrue Mion Pllc.

(57) ABSTRACT

In a stator structure for a rotation detector according to the present invention, a stator body is formed by rotating a plurality of annular stator pieces by a predetermined angle for each stator piece and laminating them, and a resin-molded frame body having a mounting ear is disposed on an outer periphery of the stator body, such that the stator body can be mounted in other equipment or the like by using the mounting ear.

6 Claims, 3 Drawing Sheets

STATOR STRUCTURE FOR A ROTATION DETECTOR

BACKGROUND OF THE INVENTION

1. Field of the Invention

The present invention relates to a stator structure for a rotation detector, and more particularly, to a novel improvement in a stator structure for a rotation detector for obtaining a high degree of freedom in registration of a mounting ear by forming an outer periphery of a stator body to a circular shape without providing the mounting ear projecting on the outer periphery and by forming a resin-molded frame body having the mounting ear on the outer periphery by resin-molding.

2. Description of the Related Art

In general, the structures shown in FIG. 5 and FIG. 6 are conventionally employed as this type of prior art stator structure for a rotation detector.

More specifically, in FIG. 5 and FIG. 6, reference numeral 1 denotes a stator body which is of an annular shape as a whole and formed by rotating a plurality of annular stator pieces 1a by a predetermined angle for each stator piece and laminating them (hereinafter, referred to as rotating and laminating them), and the stator body 1 has a mounting ear 2 projecting in the radial direction on its outer periphery.

The mounting ear 2 is provided with a mounting hole 3 being a long hole for mounting or registration of the stator body 1 in other equipment or the like.

An inner surface of the stator body 1 is provided with a plurality of magnetic poles 4 projecting inwardly, around each of which a stator winding 6 is wound via an insulating member 5 formed on each end surface of the stator body 1 and composed of an insulating mold or an insulating plate, etc. The stator windings 6 are located in slots 7 between the respective magnetic poles 4.

Respective ends 8 of the stator windings 6 are tied up in a bundle and led out to the outside of the stator 1.

The conventional stator structure for a rotation detector is constructed as described above and therefore has the following problem.

That is, since the stator body 1 has the projecting mounting ears 2 formed integrally on its outer periphery, it is necessary to change press dies used for press working the stator pieces composing the stator body, for example, each time positions of the mounting holes on the outer periphery are changed or each time positions for arranging the mounting ears are changed, whereby preparation of many kinds of press dies causes requirement of great cost.

Moreover, when the number of slots and the number of mounting holes are not equally disposed in the stator body, it is impossible to form the stator body by rotating and laminating the stator pieces as in prior art. In short, it is impossible to rotate the stator pieces by a predetermined angle for each stator piece and laminate them so that magnetic property of a material such as magnetic permeability in the circumferential direction of each stator piece is not locally concentrated. As a result, detection accuracy of the rotation detector is lowered.

SUMMARY OF THE INVENTION

The present invention has been made to solve the aforementioned problem, and has an object to provide a stator structure for a rotation detector capable of obtaining a high degree of freedom in registration of a mounting ear by forming an outer periphery of a stator body in a circular shape without providing the mounting ear projecting on the outer periphery and by forming a resin-molded frame body having the mounting ear on the outer periphery of the stator-body by resin-molding.

According to the present invention, there is provided a stator structure for a rotation detector, including: a stator body formed into an annular shape as a whole and has a plurality of magnetic poles projecting inwardly; and a stator winding provided on the plurality of magnetic poles through insulating members, in which the stator body is formed by rotating a plurality of annular stator pieces by a predetermined angle for each stator piece and laminating them and has a resin-molded frame body formed by resin-molding on an outer periphery of the stator body and provided with the mounting ear projecting along a radial direction, the mounting ear being used for mounting or registration of the stator body in other equipment. Further, the mounting ear may be provided with a mounting hole. Further, the mounting hole may have an annular bushing engaged therein. Further, insulating members may be formed integrally with the resin-molded frame body by the resin-molding. Further, the mounting hole may be a long hole. Further, the stator body may be used for a resolver. As a result, the stator body excellent in magnetic property can be obtained.

DESCRIPTION OF THE PREFERRED EMBODIMENT

Figure 1:
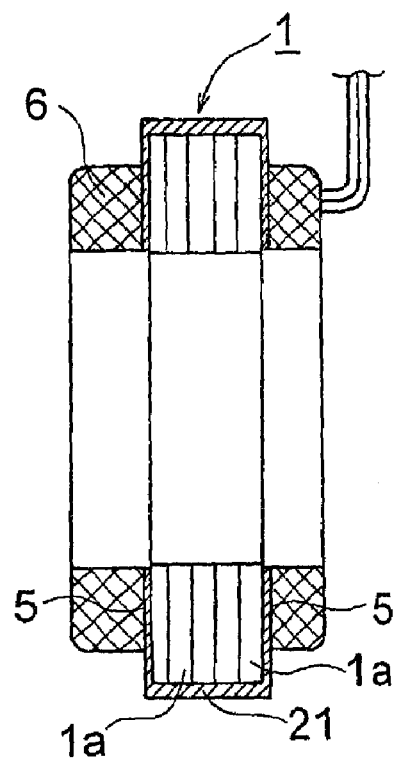
FIG. 1 is a sectional view showing a stator structure for a rotation detector according to the present invention.

Hereinafter, there will be described preferred embodiments of a stator structure for a rotation detector according to the present invention with reference to the accompanying drawings. Note that, parts similar or equivalent to those of the prior art are described using the same reference numerals as those used in the prior art.

Figure 2:
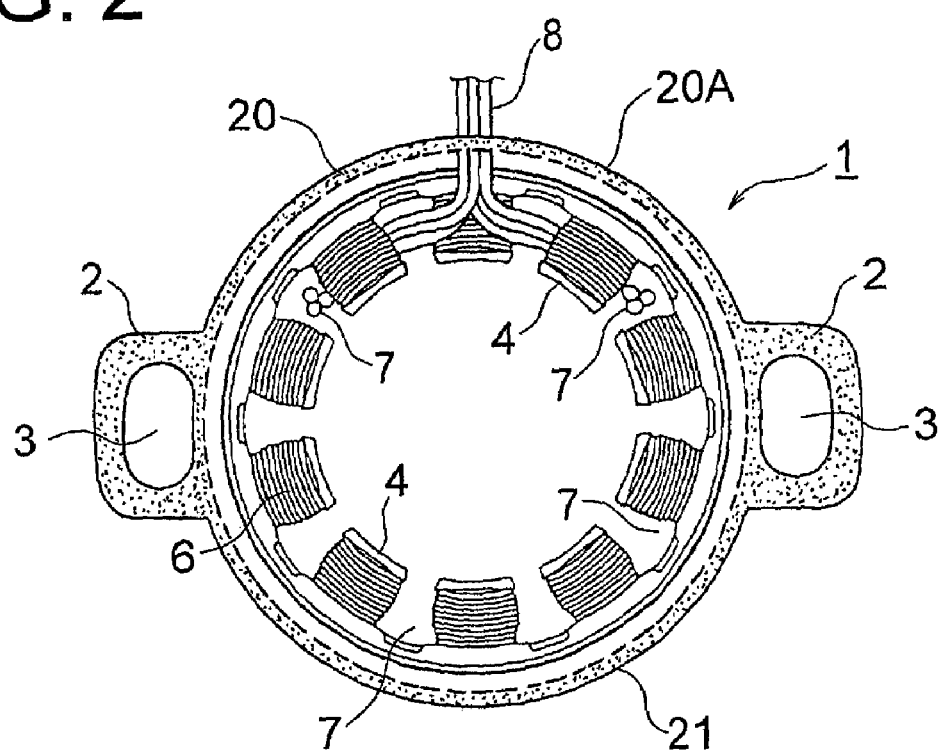
FIG. 2 is a right-side view of FIG. 1.

In FIG. 1 and FIG. 2, reference numeral 1 denotes a stator body which is annular as a whole and formed in a circular shape with no projection provided on its outer periphery, and a stator body outer diameter 20 of the stator body 1 is formed so as to have a diameter shown by the broken lines.

An inner surface of the stator body 1 is provided with a plurality of magnetic poles 4 projecting inwardly, around each of which a stator winding 6 is wound via an insulating member 5 formed on each end surface of the stator body 1 and composed of an insulating mold or an insulating plate, etc. The stator windings 6 are located in slots 7 between the respective magnetic poles 4.

Respective ends 8 of the stator windings 6 are tied up in a bundle and led out to the outside of the stator 1.

A resin-molded frame body 21 is formed by insert-injection molding or the like with resin-molding on the outer periphery of the stator outer diameter 20 of the stator body 1. The resin molded frame body 21 is formed integrally with the stator body 1 and has on its outer periphery a resin-molded surface 20A, which is integrally provided with mounting ears 2 projecting along the radial direction and having mounting holes 3 being long holes.

Therefore, this resin-molded frame body 21 is formed by registration of the stator body 1 in a not-shown resin-molding die and by injecting molten resin from a nozzle (not shown) of an injection-molding machine.

In addition, the insulating members 5 may be formed integrally with the resin-molded frame body 21 after formed by resin-molding in advance. Moreover, the insulating members 5 may be formed at the same time when the resin-molded frame body 21 is formed and thereafter the stator windings 6 may be wound around the magnetic poles 4. Furthermore, the stator windings 6 may be wound around the magnetic poles 4 after the insulating members 5 which are not formed by resin-molding but formed separately are respectively attached on each end surface of the stator body 1, and thereafter the resin-molded frame body 21 may be formed by resin-molding. Any one of these structures may be employed.

Another embodiment of the present invention will be described with reference to FIG. 3, where parts similar to those shown in Fig. 1 and FIG. 2 are denoted by the same numerals and the description thereof is omitted in order to avoid duplication and only the portions of the embodiment different from those of FIG. 1 and FIG. 2 will be described.

Figure 3:
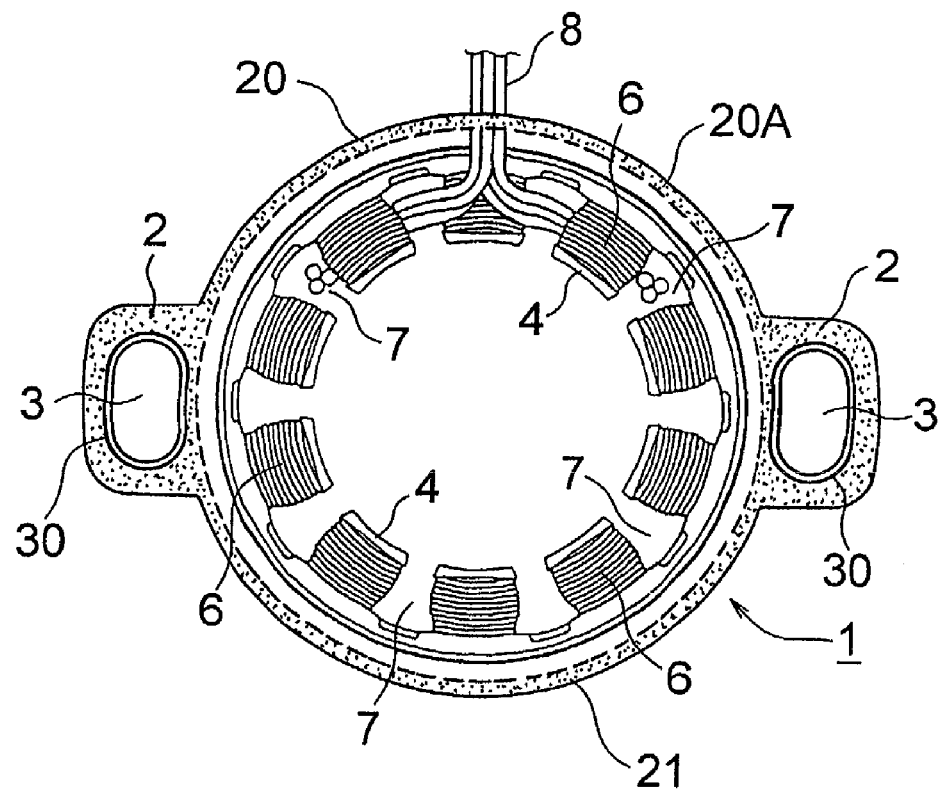
FIG. 3 is a view showing another embodiment of FIG. 2.

More specifically, an annular bushing 30 made of metal or the like are formed along an inner wall of the mounting hole 3 of the mounting ear 2 in FIG. 3 so as to be inserted and fitted into the mounting hole 3.

Figure 4:
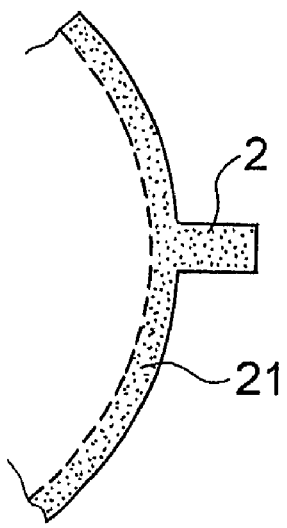
FIG. 4 is a view showing another embodiment of the main parts of FIG. 1.
Figure 5:
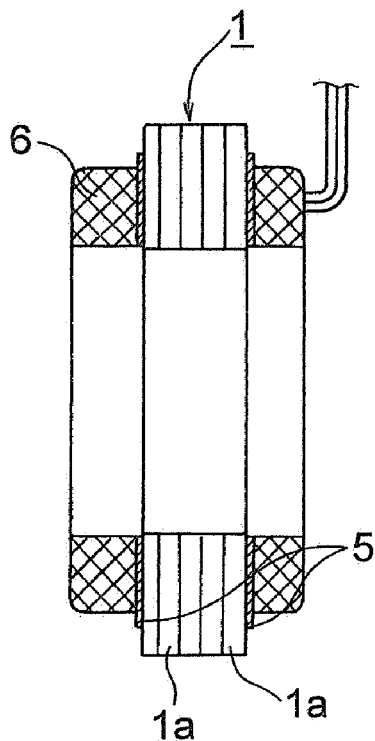
FIG. 5 is a sectional view showing a prior art structure.
Figure 6:
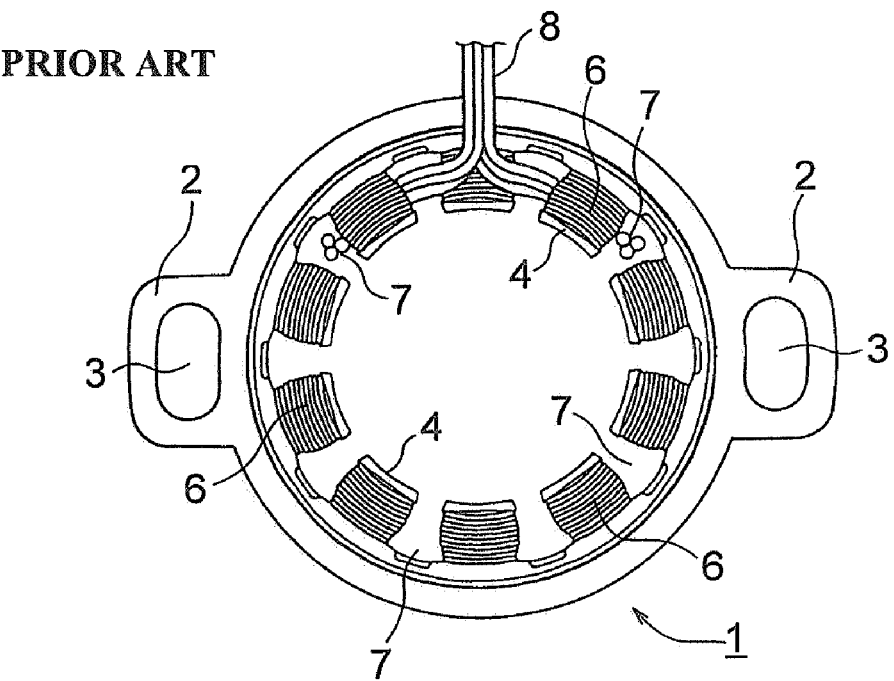
FIG. 6 is a right-side view of FIG. 5.

Further, although the mounting ear 2 provided with the mounting holes 3 are exemplified as described above, the present invention is not limited thereto, and for example, a mounting ear having only projected shape and no mounting hole 3 may be employed, as shown in FIG. 4. In addition, the mounting ear 2 may be disposed not only at two places but at one place or three places, and their positions may be set at equal or unequal angular intervals.

Since the stator structure for a rotation detector according to the present invention is constructed as described above, the following effect can be obtained.

More specifically, since the stator body has no lug and is formed in a circular shape and the mounting ear is formed integrally with the resin-molded frame body provided on the stator body, each of the stator pieces of the stator body is rotated and laminated, whereby the stator body excellent in magnetic property can be obtained.

Further, it is not necessary to prepare many press dies to form each stator piece as in prior art, and, only with respect to molding dies for forming the resin-molded frame body by injection-molding, preparing many kinds of ones is merely required, whereby cost for dies can be drastically lowered than prior art.

What is claimed is:

1. A stator structure for a rotation detector, comprising:
   a stator body formed into an annular shape as a whole and provided with a plurality of magnetic poles projecting inwardly; and
   a stator winding provided on the plurality of magnetic poles through insulating members,
   wherein the stator body is formed by rotating a plurality of annular stator pieces by a predetermined angle for each stator piece and laminating them and has a resin-molded frame body formed by resin-molding on an outer periphery of the stator body and integrally provided with a mounting ear projecting along a radial direction, the mounting ear being used for mounting or registration of the stator body in other equipment.

2. A stator structure for a rotation detector according to claim 1, wherein the mounting ear is provided with a mounting hole.

3. A stator structure for a rotation detector according to claim 2, wherein the mounting hole is a long hole.

4. A stator structure for a rotation detector according to claim 1, wherein the mounting hole has an annular bushing engaged therein.

5. A stator structure for a rotation detector according to claim 1, wherein the insulating members are formed integrally with the resin-molded frame body by the resin-molding.

6. A stator structure for a rotation detector according to claim 1, wherein the stator body is used for a resolver.

* * * * *